(12) United States Patent  
Yokoyama et al.

(10) Patent No.: US 8,244,006 B2  
(45) Date of Patent: Aug. 14, 2012

(54) FINGER VEIN IMAGE INPUTTING DEVICE AND APPARATUS USING THE SAME

(75) Inventors: Shingo Yokoyama, Hitachinaka (JP); Tadayuki Abe, Ichinoseki (JP); Hiromi Sugo, Kanegasaki (JP); Kyoichi Takahashi, Fujisawa (JP); Shoichi Sato, Ebina (JP); Soichi Sakurai, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 895 days.

(21) Appl. No.: 12/245,070

(22) Filed: Oct. 3, 2008

(65) Prior Publication Data

US 2009/0092296 A1     Apr. 9, 2009

(30) Foreign Application Priority Data

Oct. 3, 2007     (JP) ................. 2007-260119

(51) Int. Cl.
*G06K 9/00* (2006.01)
*G05B 19/00* (2006.01)
(52) U.S. Cl. .......... 382/124; 382/100; 340/5.83
(58) Field of Classification Search .......... 382/115, 382/125, 124, 100; 340/5.83, 5.82, 5.52, 340/5.53; 348/77; 713/186; 345/173; 600/476
See application file for complete search history.

(56) References Cited

U.S. PATENT DOCUMENTS 7,260,247 B2     8/2007  Kita

FOREIGN PATENT DOCUMENTS

| CN | 1510639 |   | 7/2004 |
|----|---------|---|--------|
| CN | 1510639 A | * | 7/2004 |
| CN | 1662931 |   | 8/2005 |
| CN | 1662931 A | * | 8/2005 |
| CN | 1760890 |   | 4/2006 |
| CN | 1760890 A | * | 4/2006 |
| EP | 1 503 330 |   | 2/2005 |
| JP | 2005-323871 |   | 11/2005 |
| JP | 2006-028872 |   | 2/2006 |
| JP | 2006-099493 |   | 4/2006 |
| JP | 2007-219625 |   | 8/2007 |

OTHER PUBLICATIONS

Office Action issued in Japanese Patent Application No. 2007-260119 on Jan. 31, 2012.

* cited by examiner

*Primary Examiner* — Sheela Chawan
(74) *Attorney, Agent, or Firm* — Antonelli, Terry, Stout & Kraus, LLP.

(57) ABSTRACT

There is a need for providing a finger vein image inputting device that can miniaturize and thin a finger vein authentication apparatus and provide high authentication accuracy. The finger vein image inputting device according to the present invention includes a body, a band pass filter for transmitting only light of a specific wavelength, a light source for applying light to a finger placed over the band pass filter, and an imaging means for imaging transmitted light from the finger. A gradient index lens is provided between the band pass filter and the imaging means and causes refractive-index distribution around an optical axis. A polarizing filter is provided at least one of between the light source and the finger and between the finger and an imaging device.

24 Claims, 5 Drawing Sheets

FINGER VEIN IMAGE INPUTTING DEVICE AND APPARATUS USING THE SAME

CLAIM OF PRIORITY

The present application claims priority from Japanese Patent Application No. 2007-260119 filed on Oct. 3, 2007, the content of which is hereby incorporated by reference into this application.

BACKGROUND OF THE INVENTION (1) Field of the Invention

The present invention relates to a biometrics authentication technique and more particularly to a finger vein image inputting device used for a finger vein authentication apparatus.

(2) Description of the Related Art

Conventionally, passwords, keys, and seals have been used for personal identification. There is an increasing demand for improving a technique of personal identification as advancement of information society. Attention is focused on the biometrics using bodily characteristics specific to individuals. The biometrics has advantages of excellent convenience and improved security against theft, loss, invalid transfer, or oblivion for the secret data such as credit cards, etc.

The biometrics uses bodily characteristics such as fingerprint, palm, face, iris, voice pattern, and vein for personal authentication. Using finger veins, the finger vein authentication particularly causes less psychological resistance than fingerprints and is hardly falsified.

The finger vein authentication uses the fact that a hemoglobin in blood absorbs near infrared ray having a wavelength range of 700 to 1200 nm. The finger vein authentication applies the near infrared ray to a finger, images a vein pattern inside the finger, and collates the pattern with registered information for personal authentication.

The finger vein authentication provides a higher authentication accuracy than the finger print authentication and is used for cash dispenser or other products that require a high level of security.

Recently, mobile telephones equipped with an electronic money function are widely used. As a countermeasure against loss or theft of the mobile telephones, there is a demand for providing these mobile telephones with a function of authenticating an owner. Actually, some mobile telephones are equipped with finger print authentication devices. For an increased level of security, there is a demand for providing a mobile telephone with a finger vein authentication apparatus. However, the finger vein authentication apparatus needs to be miniaturized so as to be mounted on the mobile telephone.

JP-A No. 28872/2006 discloses an embodiment of using the gradient index lens array and the linear solid-state image sensor for miniaturizing the finger vein authentication apparatus.

The technique in JP-A No. 28872/2006 miniaturizes the finger vein authentication apparatus by using an optical system that applies light to the pad and the side of a finger. The light diffuses in the finger and is transmitted through the finger. The light is imaged under the finger pad to generate a vein image. Since the optical system makes a light source to be close to the finger surface, the light easily reflects on the finger surface, causing an unclear finger vein image due to the reflected light. When a mobile telephone is equipped with the optical system, it is necessary to consider the influence of outside light such as the sunlight because the mobile telephone may be used outdoors or in a bright room.

According to JP-A No. 28872/2006, the light is applied to the finger pad from a light emitting diode (LED) as a light source. JP-A No. 28872/2006 describes no means for decreasing the reflected light on the finger surface. In addition, JP-A No. 28872/2006 describes no means for decreasing the influence of outside light such as the sunlight.

It is therefore an object of the present invention to miniaturize and thin a finger vein authentication apparatus. It is another object of the present invention to provide a finger vein image inputting device capable of high authentication accuracy.

SUMMARY OF THE INVENTION

The finger vein image inputting device according to the present invention includes a body, a band pass filter for transmitting only light of a specific wavelength, a light source for applying light to a finger placed over the band pass filter, and an imaging means for imaging transmitted light from the finger. A gradient index lens (GRIN lens) is provided between the band pass filter and the imaging means and causes refractive-index distribution around an optical axis. A polarizing filter is provided at least one of between the light source and the finger and between the finger and an imaging device.

The invention can provide a finger vein image inputting device that can miniaturize and thin a finger vein authentication apparatus and provide high authentication accuracy.

DETAILED DESCRIPTION OF THE PREFERRED EMBODIMENTS

Figure 1:
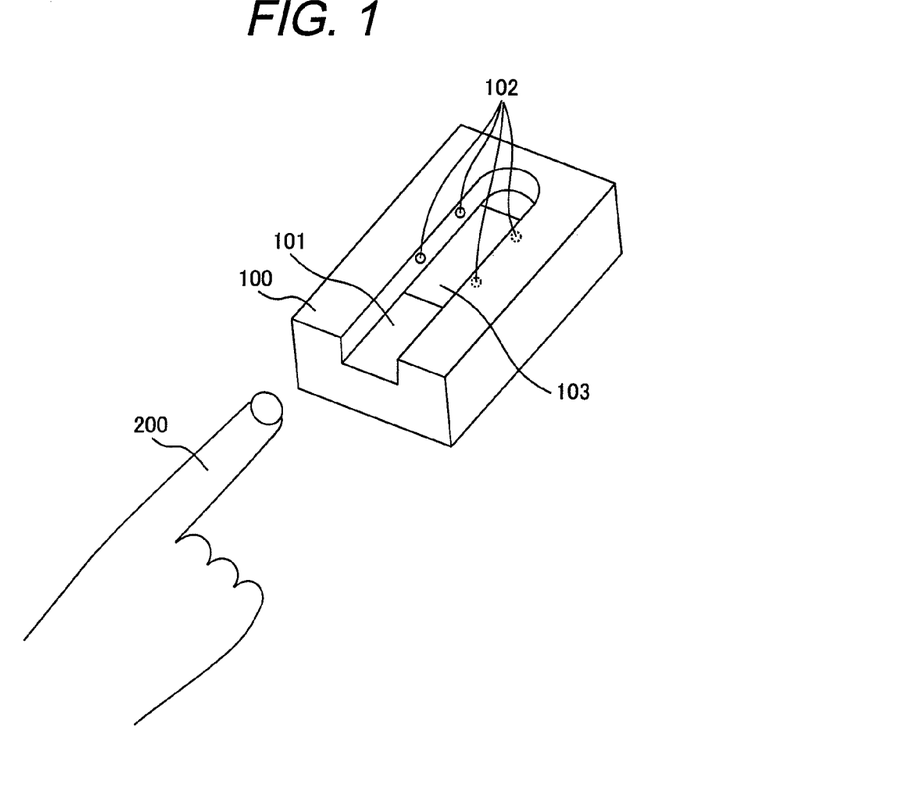
FIG. 1 is a perspective view showing the finger vein image inputting device of the invention according to first to fourth embodiments.

FIG. 1 is a perspective view showing the first to fourth embodiments of the finger vein image inputting device. The embodiments will be described below in detail.

With reference to FIG. 1, the following describes a construction of the finger vein image inputting device according to the invention. The finger vein image inputting device according to the embodiment includes a body 100, a finger placing section 101, a light source 102, and an imaging section 103. The finger placing section 101 is a recess formed on the body 100 and is shaped and sized so as to be capable of placing a finger. The light source 102 is provided at the side of an inner wall of the finger placing section 101. The light source 102 generates near infrared ray having a specific wavelength suitable for imaging in a wavelength range of 700 to 1200 nm.

The embodiment in FIG. 1 uses two light sources on each side, namely four light sources in total. An LED or a laser light source may be used for the light source 102. The imaging section 103 is provided at the bottom of the finger placing section 101. The imaging section 103 includes an imaging device (not shown) that images a vein pattern inside a finger 200. The light from the light source 102 is applied to the finger 200. The light is diffused in the finger 200. Transmitted light is generated from the finger 200. The imaging device captures the transmitted light.

According to the embodiment, the light source 102 is provided closely to the finger 200. The light generated from the light source 102 may reflect on the surface of the finger 200 and the reflected light may enter the imaging device. As a result, a finger vein image may become unclear. Outside light such as the sunlight including the near infrared ray may cause the finger vein image to be unclear. As will be described later, the invention provides a mechanism for preventing the light from being reflected on the surface of the finger 200, a mechanism for preventing the light reflected on the surface of the finger 200 from reaching the imaging device, and a mechanism for eliminating an effect of the outside light.

When the finger vein image inputting device is used for a mobile telephone, the body 100 complies with a body of the mobile telephone.

First Embodiment

Figure 2:
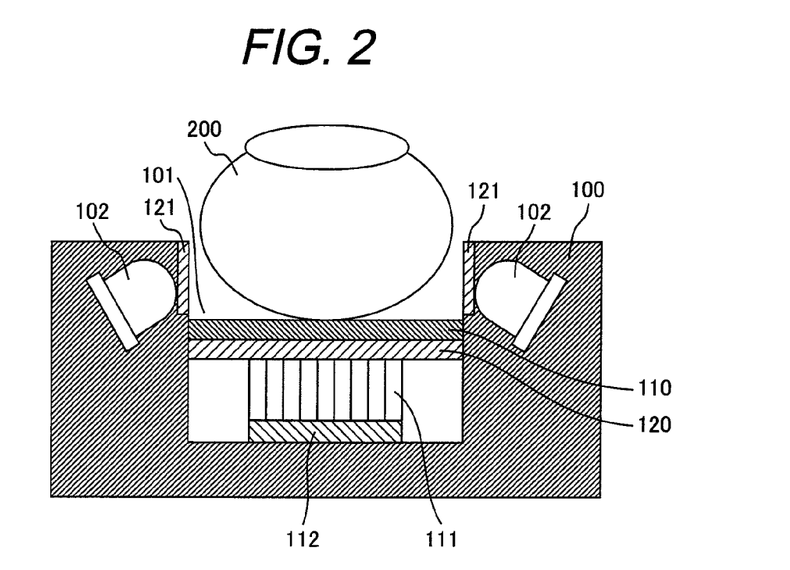
FIG. 2 is a sectional view showing the first embodiment of the finger vein image inputting device according to the invention.

With reference to FIG. 2, the following describes the first embodiment of the finger vein image inputting device according to the invention. FIG. 2 shows a sectional view of the finger vein image inputting device according to the embodiment.

In the finger vein image inputting device according to the embodiment, the light source 102 is provided inside the body 100 or is embedded toward the inside from the side of the finger placing section 101. The light source 102 is provided so that an optical axis thereof tilts with reference to the bottom surface of the finger placing section 101. Optical axes of the two light sources 102 cross inside the finger 200. A polarizing filter 121 is provided on the side of the finger placing section 101. The polarizing filter 121 is provided in front of and closely to the light source 102.

The bottom of the finger placing section 101 is provided with a band pass filter 110, a polarizing filter 120, a gradient index lens array 111, and a solid-state image sensor 112. These components constitute the imaging section 103 in FIG. 1. The band pass filter 110, the polarizing filter 120, the gradient index lens array 111, and the solid-state image sensor 112 are provide for a recess formed in the body 100. The band pass filter 110 and an upper part of the recess constitute the finger placing section 101.

The band pass filter 110 is provided so as to be in contact with the pad of the finger 200 when the finger 200 is placed on the finger placing section 101. The polarizing filter 120 is provided under the band pass filter 110 so as to be in contact with the band pass filter 110. Similarly, the gradient index lens array 111 is arranged under the polarizing filter 120 so as to be in contact with the polarizing filter 120. The solid-state image sensor 112 is arranged under the gradient index lens array 111 so as to be in contact with the gradient index lens array 111.

The band pass filter 110 transmits the light of a specific wavelength from the light source 102 and does not transmit the other lights. The polarizing filters 120 and 121 transmit only the polarized light, namely the light vibrating in a specific direction (transmission axis). The gradient index lens array 111 includes multiple gradient index lenses (GRIN lenses). The shape of the gradient index lens is cylindrical. The gradient index lens has a refractive-index distribution toward the outside periphery around the optical axis as a normal line on a face including the optical axis.

The light from the light source 102 is transmitted through the polarizing filter 121 to become polarized light having an optimal vibration direction (transmission axis). The polarized light is applied to the finger 200. Applying the polarized light to the finger 200 can reduce the reflection on the surface of the finger 200. The light entering inside the finger 200 is diffused. The diffused light is partly absorbed and partly enters the band pass filter 110.

The band pass filter 110 transmits only the light of the specific wavelength corresponding to the light source 102. This makes it possible to prevent a finger vein image from being affected by outside light such as the sunlight entering the band pass filter 110. When the wave length of light from the light source 102 approximately matches the wavelength of light transmitted through the band pass filter 110, the recognition accuracy is greatly improved by sufficient light strength.

Only the polarized light transmitted through the band pass filter 110 is transmitted through the polarizing filter 120. The light transmitted through the band pass filter 110 and the polarizing filter 120 is further transmitted through the gradient index lens array 11 and reaches the solid-state image sensor 112. As mentioned above, a hemoglobin in blood absorbs near infrared ray having a wavelength range of 700 to 1200 nm. Accordingly, the solid-state image sensor 112 can clearly capture a vein silhouette of the finger 200. The embodiment smoothly collates a vein image with the registered information and improves the recognition accuracy.

According to the embodiment, the polarizing filter 121 is provided in front of the light source 102. The polarizing filter 120 is provided away from the solid-state image sensor 112 so as to be close to a finger. The polarizing filter 121 may not completely prevent the light from reflecting on the surface of the finger 200. In such case, the polarizing filter 120 prevents the light reflected on the surface of the finger 200 from reaching the solid-state image sensor 112.

The gradient index lens array 111 can generate an image at the same magnification and shorten a distance between a vein inside the finger 200 as an object surface and the solid-state image sensor as an imaging surface. Therefore, the finger vein image inputting device according to the embodiment can be miniaturized and thinned suitable for mounting on a mobile telephone.

Second Embodiment

Figure 3:
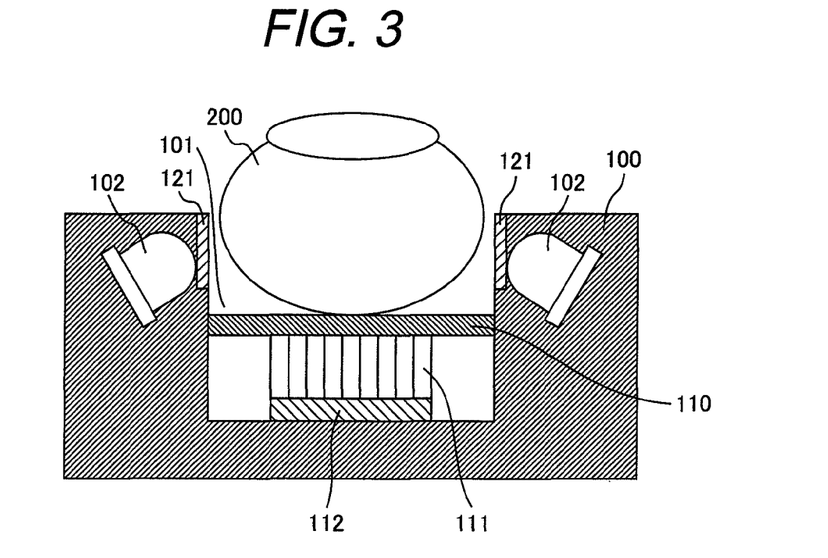
FIG. 3 is a sectional view showing the second embodiment of the finger vein image inputting device according to the invention.

With reference to FIG. 3, the following describes the second embodiment of the finger vein image inputting device according to the invention. FIG. 3 shows a sectional view of the finger vein image inputting device according to the embodiment. The finger vein image inputting device according to the embodiment differs from the first embodiment in FIG. 2 in that the polarizing filter 120 is not provided under the band pass filter 110. The other parts of the construction may be the same as those of the first embodiment in FIG. 2.

According to this embodiment, the polarizing filter 120 is not provided under the band pass filter 110. Similarly to the first embodiment, the polarizing filter 121 is provided in front of the light source 102. This makes it possible to ensure a specified authentication accuracy. The number of polarizing filters in the second embodiment is smaller than that in the first embodiment, thus reducing the cost.

Elimination of the polarizing filter 120 increases the quantity of light reaching the solid-state image sensor 112 from the light source 102. The effect is to increase the transmittance of an optical path from the light source 102 to the solid-state image sensor 112. It is possible to decrease the light quantity of the light source 102 and save the power of the same.

It may be preferable to omit the polarizing filter 121 in front of the light source 102 and provide the polarizing filter 120 under the band pass filter 110 instead. In this case also, similar effects are produced. A radiating area of the light source 102 may be provided with a protective filter for transmitting the light of a specific wavelength.

Third Embodiment

Figure 4:
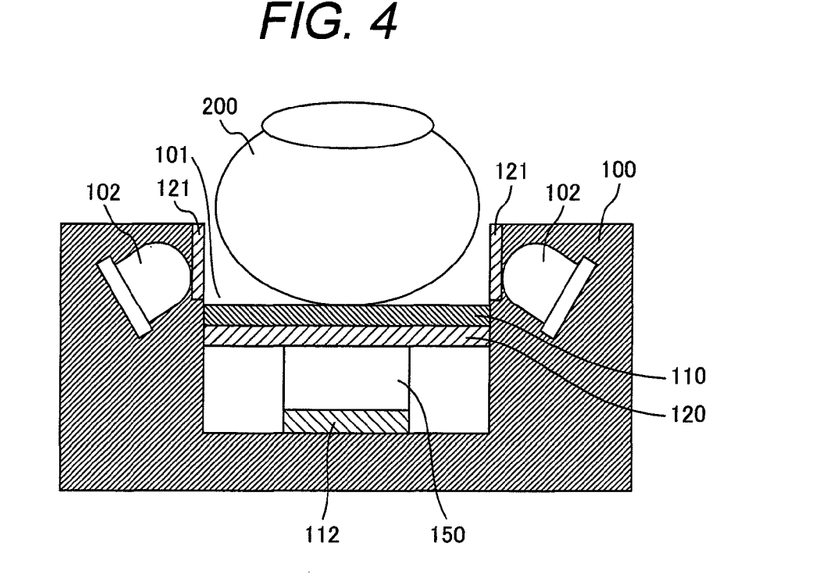
FIG. 4 is a sectional view showing the third embodiment of the finger vein image inputting device according to the invention.

With reference to FIG. 4, the following describes the third embodiment of the finger vein image inputting device according to the invention. FIG. 4 shows a sectional view of the finger vein image inputting device according to the embodiment. The finger vein image inputting device according to the third embodiment differs from the first embodiment in FIG. 2 in that single gradient index lens 150 is used as an imaging lens instead of the gradient index lens array 111.

The third embodiment uses the smaller solid-state image sensor 112 than that used for the first embodiment in FIG. 2. The other parts of the construction may be the same as those of the first embodiment in FIG. 2. The first embodiment in FIG. 2 uses the gradient index lens array 111 as an imaging lens and is capable of increasing areas for the gradient index lens array 111 and the solid-state image sensor 112. The finger 200 can be imaged in a wider range. However, the gradient index lens array 111 is structured so as to arrange multiple cylindrical gradient index lenses adjacently to each other. An image captured by the solid-state image sensor 112 becomes discontinuous where the lenses are in contact with each other.

To solve this problem, single gradient index lens may be used when it is possible to ensure an imaging range needed for a specified authentication accuracy. The third embodiment uses single gradient index lens 150 instead of the gradient index lens array 111. The structure of the finger vein image inputting device is simplified, making the assembly and adjustment easy and reducing costs. It is possible to solve the problem of a discontinuous image due to the use of multiple gradient index lenses. A clear finger vein image can be generated to improve the authentication accuracy.

In FIGS. 2 and 4, the finger 200, the band pass filter 110, and the polarizing filter 120 are vertically arranged in this order. Similar effects are also produced when the band pass filter 110 and the polarizing filter 120 are reversed.

Fourth Embodiment

Figure 5:
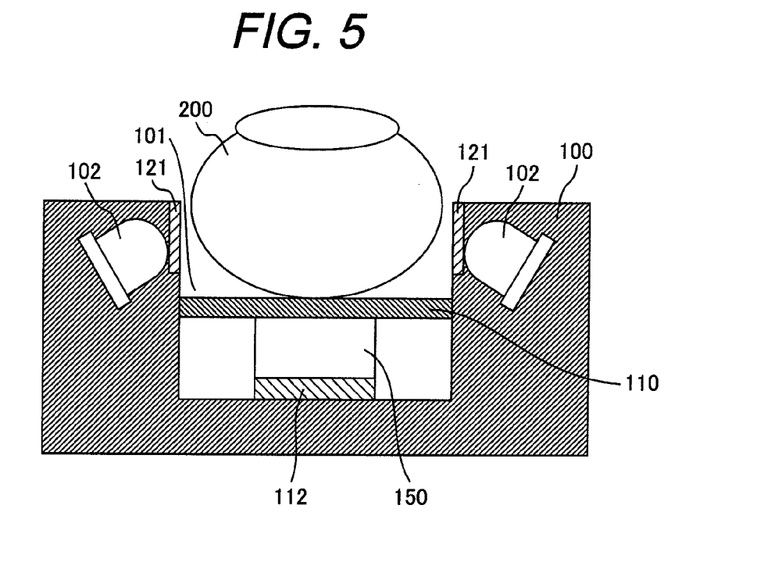
FIG. 5 is a sectional view showing the fourth embodiment of the finger vein image inputting device according to the invention.

With reference to FIG. 5, the following describes the fourth embodiment of the finger vein image inputting device according to the invention. FIG. 5 shows a sectional view of the finger vein image inputting device according to the embodiment. The finger vein image inputting device according to the embodiment differs from the third embodiment in FIG. 4 in that the polarizing filter 120 is not provided under the band pass filter 110. The other parts of the construction may be the same as those of the third embodiment in FIG. 4.

The finger vein image inputting device according to the fourth embodiment differs from the second embodiment in FIG. 3 in that single gradient index lens 150 is used as an imaging lens instead of the gradient index lens array 111. The fourth embodiment uses the smaller solid-state image sensor 112 than that used for the second embodiment in FIG. 3. The other parts of the construction may be the same as those of the second embodiment in FIG. 3.

The embodiment uses single gradient index lens 150 and decreases the number of polarizing filters for cost reduction. Elimination of the polarizing filter 120 increases the quantity of light reaching the solid-state image sensor 112 from the light source 102. The effect is to increase the transmittance of an optical path from the light source 102 to the solid-state image sensor 112. It is possible to decrease the light quantity of the light source 102 and save the power of the same. It is possible to solve the problem of a discontinuous image due to the use of multiple gradient index lenses. A clear finger vein image can be generated to improve the authentication accuracy.

In the embodiment of FIG. 5, it may be preferable to omit the polarizing filter 121 in front of the light source 102 and provide the polarizing filter 120 under the band pass filter 110 instead. In this case also, similar effects are produced. A radiating area of the light source 102 may be provided with a protective filter for transmitting the light.

Figure 6:
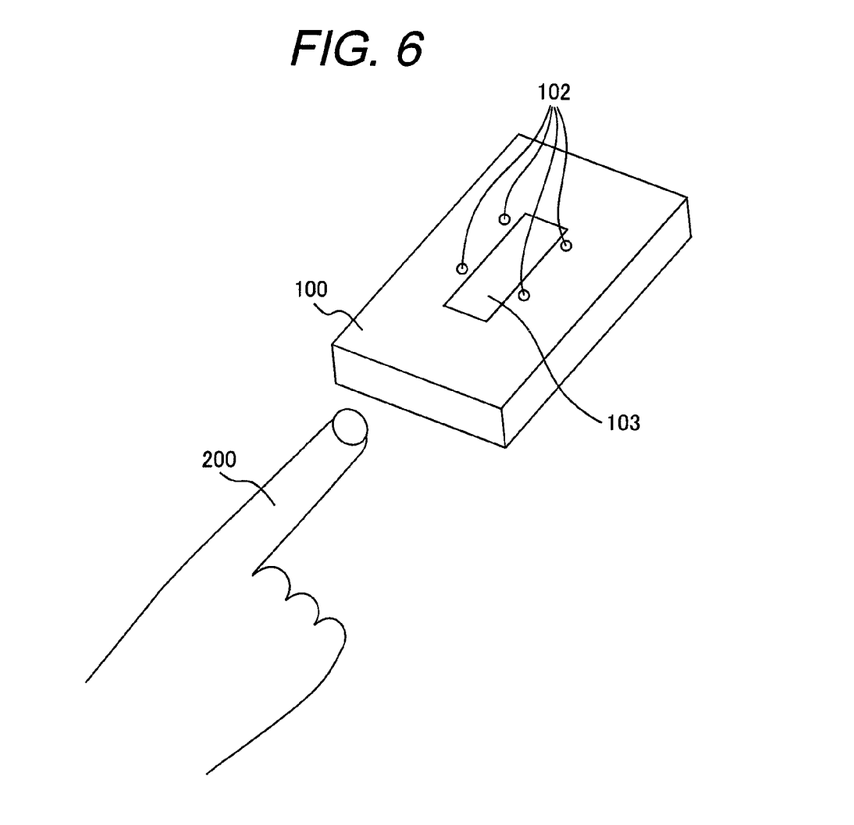
FIG. 6 is a perspective view showing the finger vein image inputting device of the invention according to fifth to eighth embodiments.

FIG. 6 is a perspective view showing the fifth to eighth embodiments of the finger vein image inputting device. The embodiments will be described below in detail.

With reference to FIG. 6, the following describes another construction of the finger vein image inputting device according to the invention. The finger vein image inputting device according to the embodiment includes the body 100, the light source 102, and the imaging section 103. The embodiment provides no recess for placing a finger. A finger is placed on the imaging section 103. That is, the imaging section 103 also functions as the finger placing section.

The embodiment provides the light sources 102 on both sides of the imaging section 103. The light source 102 generates near infrared ray having a specific wavelength suitable for imaging in a wavelength range of 700 to 1200 nm. The embodiment in FIG. 6 uses two light sources on each side, namely four light sources in total. An LED or a laser light source may be used for the light source 102.

The imaging section 103 includes an imaging device (not shown) that images a vein pattern inside the finger 200. The light from the light source 102 is applied to the finger 200. The light is diffused in the finger 200. Transmitted light is generated from the finger 200. The imaging device captures the transmitted light.

According to the embodiment, the light source 102 is provided closely to the finger 200. The light generated from the light source 102 may reflect on the surface of the finger 200 and the reflected light may enter the imaging device. As a result, a finger vein image may be come unclear. Out sidelight such as the sunlight including the near infrared ray may cause the finger vein image to be unclear.

As will be described later, the invention provides a mechanism for preventing the light from being reflected on the surface of the finger 200, a mechanism for preventing the light reflected on the surface of the finger 200 from reaching the imaging device, and a mechanism for eliminating an effect of the outside light.

When the finger vein image inputting device is used for a mobile telephone, the body 100 complies with a body of the mobile telephone.

Fifth Embodiment

Figure 7:
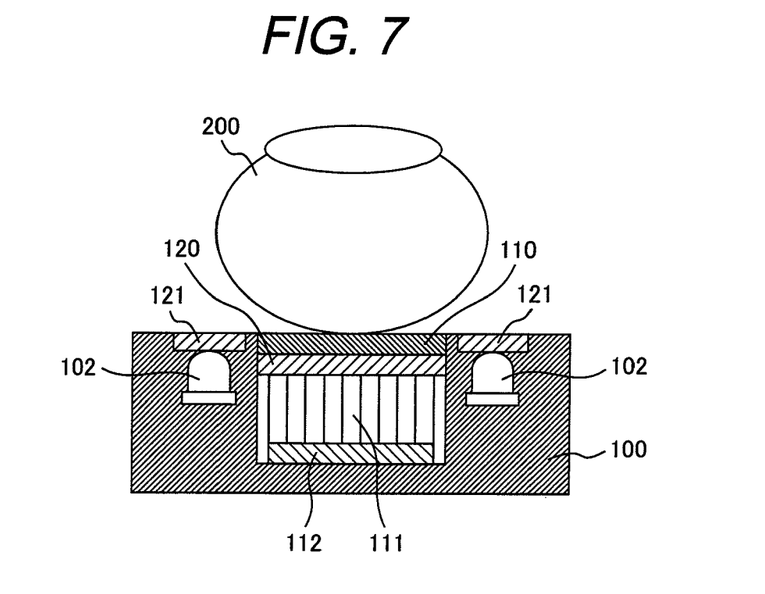
FIG. 7 is a sectional view showing the fifth embodiment of the finger vein image inputting device according to the invention.

With reference to FIG. 7, the following describes the fifth embodiment of the finger vein image inputting device according to the invention. FIG. 7 shows a sectional view of the finger vein image inputting device according to the embodiment. The finger vein image inputting device according to the embodiment uses the light source 102 so as to be embedded in the body 100. The light source 102 is arranged so that its optical axis is orthogonal to the top surface of the body 100. Optical axes of the two light sources 102 are parallel to each other. Similarly to the first embodiment in FIG. 2, the fifth embodiment may arrange the light source 102 so that its optical axis tilts with reference to the top surface of the body 100.

The polarizing filter 121 is provided on the top surface of the body 100. The polarizing filter 121 is provided in front of and closely to the light source 102.

The bandpass filter 110 is also provided on the top surface of the body 100. Below the band pass filter 110, there are provided the polarizing filter 120, the gradient index lens array 111, and the solid-state image sensor 112. These components constitute the imaging section 103 in FIG. 6. The band pass filter 110 is provided so as to be in contact with the pad of the finger 200 when the finger 200 is placed on the top surface of the body 100. The polarizing filter 120 is provided under the band pass filter 110 so as to be in contact with the band pass filter 110. Similarly, the gradient index lens array 111 is arranged under the polarizing filter 120 so as to be in contact with the polarizing filter 120. The solid-state image sensor 112 is arranged under the gradient index lens array 111 so as to be in contact with the gradient index lens array 111.

The band pass filter 110, the polarizing filter 120, the gradient index lens array 111, and the solid-state image sensor 112 may be the same as those used for the first embodiment in FIG. 2.

The light from the light source 102 is transmitted through the polarizing filter 121 to become polarized light having an optimal vibration direction (transmission axis). The polarized light is applied to the finger 200. Applying the polarized light to the finger 200 can reduce the reflection on the surface of the finger 200. The light entering inside the finger 200 is diffused. The diffused light is partly absorbed and partly enters the band pass filter 110.

The band pass filter 110 transmits only the light of the specific wavelength corresponding to the light source 102. This makes it possible to prevent a finger vein image from being affected by outside light such as the sunlight entering the band pass filter 110. Only the polarized light transmitted through the band pass filter 110 is transmitted through the polarizing filter 120. The light transmitted through the band pass filter 110 and the polarizing filter 120 is further transmitted through the gradient index lens array 11 and reaches the solid-state image sensor 112.

As mentioned above, a hemoglobin in blood absorbs near infrared ray having a wavelength range of 700 to 1200 nm. Accordingly, the solid-state image sensor 112 can clearly capture a vein silhouette of the finger 200. The embodiment smoothly collates a vein image with the registered information and improves the recognition accuracy.

According to the embodiment, the polarizing filter 121 is provided in front of the light source 102. The polarizing filter 120 is provided away from the solid-state image sensor 112 so as to be close to a finger. The polarizing filter 121 may not completely prevent the light from reflecting on the surface of the finger 200. In such case, the polarizing filter 120 prevents the light reflected on the surface of the finger from reaching the solid-state image sensor 112.

The gradient index lens array 111 can generate an image at the same magnification and shorten a distance between a vein inside the finger 200 as an object surface and the solid-state image sensor 112 as an imaging surface. The finger vein image inputting device can be miniaturized and thinned. The finger vein image inputting device according to the embodiment can be mounted on a mobile telephone.

Sixth Embodiment

Figure 8:
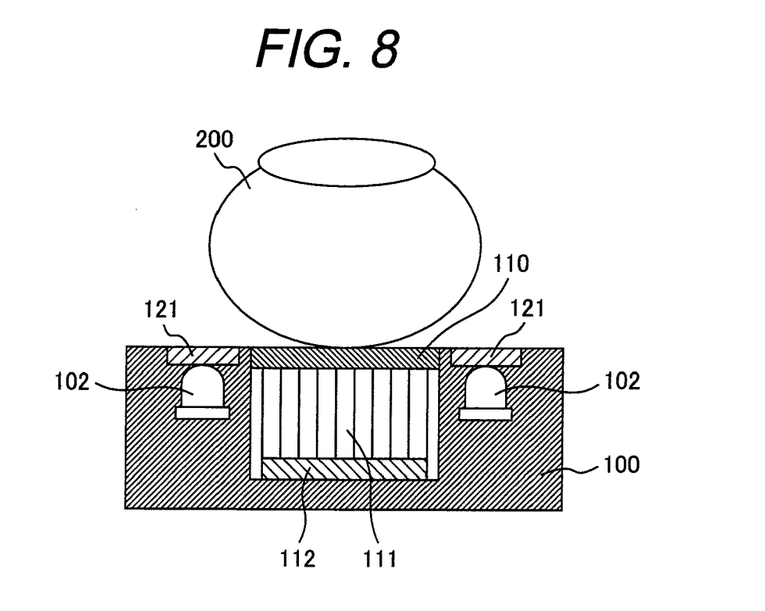
FIG. 8 is a sectional view showing the sixth embodiment of the finger vein image inputting device according to the invention.

With reference to FIG. 8, the following describes the sixth embodiment of the finger vein image inputting device according to the invention. FIG. 8 shows a sectional view of the finger vein image inputting device according to the embodiment. The finger vein image inputting device according to the embodiment differs from the fifth embodiment in FIG. 7 in that the polarizing filter 120 is not provided under the band pass filter 110. The other parts of the construction may be the same as those of the fifth embodiment in FIG. 7.

According to this embodiment, the polarizing filter 120 is not provided under the band pass filter 110. Similarly to the fifth embodiment, the polarizing filter 121 is provided in front of the light source 102. This makes it possible to ensure a specified authentication accuracy. The number of polarizing filters in the sixth embodiment is smaller than that in the fifth embodiment, thus reducing the cost. Elimination of the polarizing filter 120 increases the quantity of light reaching the solid-state image sensor 112 from the light source 102. The effect is to increase the transmittance of an optical path from the light source 102 to the solid-state image sensor 112. It is possible to decrease the light quantity of the light source 102 and save the power of the same.

It may be preferable to omit the polarizing filter 121 in front of the light source 102 and provide the polarizing filter 120 under the band pass filter 110 instead. In this case also, similar effects are produced. A radiating area of the light source 102 may be provided with a protective filter for transmitting the light of a specific wavelength.

Seventh Embodiment

Figure 9:
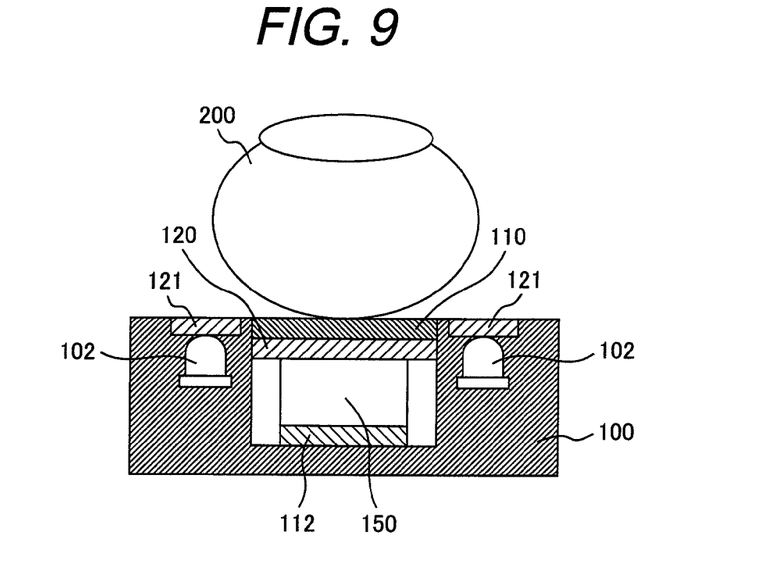
FIG. 9 is a sectional view showing the seventh embodiment of the finger vein image inputting device according to the invention.

With reference to FIG. 9, the following describes the seventh embodiment of the finger vein image inputting device according to the invention. FIG. 9 shows a sectional view of the finger vein image inputting device according to the embodiment. The finger vein image inputting device according to the seventh embodiment differs from the fifth embodiment in FIG. 7 in that single gradient index lens 150 is used as an imaging lens instead of the gradient index lens array 111. The seventh embodiment uses the smaller solid-state image sensor 112 than that used for the fifth embodiment in FIG. 7. The other parts of the construction may be the same as those of the fifth embodiment in FIG. 7. The fifth embodiment in FIG. 7 uses the gradient index lens array 111 as an imaging lens and is capable of increasing areas for the gradient index lens array 111 and the solid-state image sensor 112. The finger 200 can be imaged in a wider range.

However, the gradient index lens array 111 is structured so as to arrange multiple cylindrical gradient index lenses adjacently to each other. An image captured by the solid-state image sensor 112 becomes discontinuous where the lenses are in contact with each other. To solve this problem, single gradient index lens may be used when it is possible to ensure an imaging range needed for a specified authentication accuracy.

The seventh embodiment uses single gradient index lens 150 instead of the gradient index lens array 111. The structure of the finger vein image inputting device is simplified, making the assembly and adjustment easy and reducing costs. It is possible to solve the problem of a discontinuous image due to the use of multiple gradient index lenses. A clear finger vein image can be generated to improve the authentication accuracy. In FIGS. 7 and 9, the finger 200, the band pass filter 110, and the polarizing filter 120 are vertically arranged in this order. Similar effects are also produced when the band pass filter 110 and the polarizing filter 120 are reversed.

Eighth Embodiment

Figure 10:
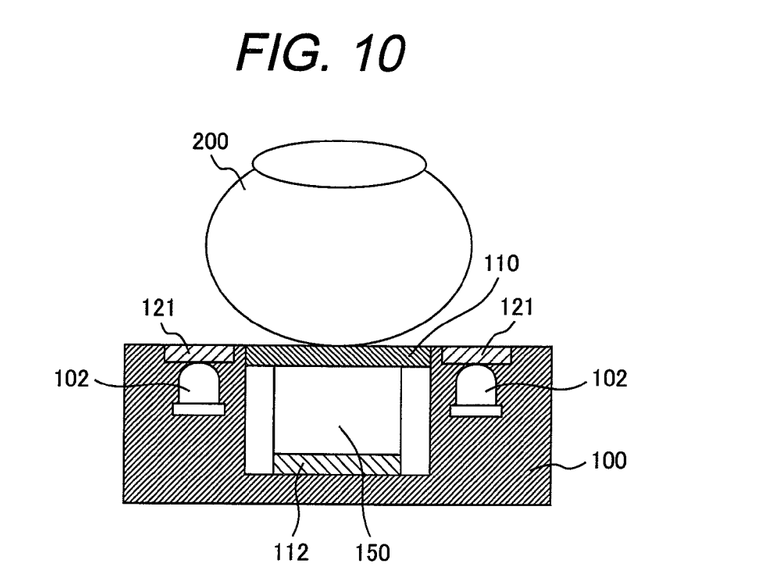
FIG. 10 is a sectional view showing the eighth embodiment of the finger vein image inputting device according to the invention.

With reference to FIG. 10, the following describes the eighth embodiment of the finger vein image inputting device according to the invention. FIG. 10 shows a sectional view of the finger vein image inputting device according to the embodiment. The finger vein image inputting device according to the embodiment differs from the seventh embodiment in FIG. 9 in that the polarizing filter 120 is not provided under the band pass filter 110. The other parts of the construction may be the same as those of the seventh embodiment in FIG. 9.

The finger vein image inputting device according to the eighth embodiment differs from the sixth embodiment in FIG. 8 in that single gradient index lens 150 is used as an imaging lens instead of the gradient index lens array 111. The eighth embodiment uses the smaller solid-state image sensor 112 than that used for the sixth embodiment in FIG. 8. The other parts of the construction may be the same as those of the sixth embodiment in FIG. 8.

The embodiment uses single gradient index lens 150 and decreases the number of polarizing filters for cost reduction. Elimination of the polarizing filter 120 increases the quantity of light reaching the solid-state image sensor 112 from the light source 102. The effect is to increase the transmittance of an optical path from the light source 102 to the solid-state image sensor 112. It is possible to decrease the light quantity of the light source 102 and save the power of the same. It is possible to solve the problem of a discontinuous image due to the use of multiple gradient index lenses. A clear finger vein image can be generated to improve the authentication accuracy.

In the embodiment of FIG. 10, it may be preferable to omit the polarizing filter 121 in front of the light source 102 and provide the polarizing filter 120 under the band pass filter 110 instead. In this case also, similar effects are produced. A radiating area of the light source 102 may be provided with a protective filter for transmitting the light.

While there have been described specific preferred embodiments of the present invention, it is to be distinctly understood by those skilled in the art that the present invention is not limited thereto but may be otherwise variously embodied within the spirit and scope of the invention.

What is claimed is:

1. A finger vein image inputting device comprising:
   a band pass filter for transmitting the light of a specific wavelength;
   a light source provided adjacently to the band pass filter for applying light to a finger placed over the band pass filter;
   an imaging section for generating a finger vein image by receiving light that is applied from the light source, diffused in the finger, transmitted through the finger, and transmitted through the band pass filter; and
   a gradient index lens having refractive-index distribution around an optical axis and generating an image at the same magnification provided between the band pass filter and the imaging section; and the imaging section is arranged under the gradient index lens so as to be in contact with the gradient index lens.

2. The finger vein image inputting device according to claim 1,
   wherein the gradient index lens includes a gradient index lens array having a plurality of gradient index lenses.

3. The finger vein image inputting device according to claim 2,
   wherein a wavelength of light from the light source approximately matches a wavelength of light transmitted through the band pass filter.

4. The finger vein image inputting device according to claim 3,
   further comprising a polarizing filter provided at least one of between the light source and the finger and between the finger and the imaging device.

5. The finger vein image inputting device according to claim 4,
   wherein the light source, the band pass filter, the gradient index lens, and the imaging section are attached to the body of an apparatus.

6. The finger vein image inputting device according to claim 5, wherein the body belongs to a mobile telephone apparatus.

7. The finger vein image inputting device according to claims 3,
   wherein the light source, the band pass filter, the gradient index lens, and the imaging section are attached to the body of an apparatus.

8. The finger vein image inputting device according to claim 7, wherein the body belongs to a mobile telephone apparatus.

9. The finger vein image inputting device according to claim 2,
   further comprising a polarizing filter provided at least one of between the light source and the finger and between the finger and the imaging device.

10. The finger vein image inputting device according to claim 9,
    wherein the light source, the band pass filter, the gradient index lens, and the imaging section are attached to the body of an apparatus.

11. The finger vein image inputting device according to claim 10, wherein the body belongs to a mobile telephone apparatus.

12. The finger vein image inputting device according to claim 2,
    wherein the light source, the band pass filter, the gradient index lens, and the imaging section are attached to the body of an apparatus.

13. The finger vein image inputting device according to claim 12, wherein the body belongs to a mobile telephone apparatus.

14. The finger vein image inputting device according to claim 1,
    wherein a wavelength of light from the light source approximately matches a wavelength of light transmitted through the band pass filter.

15. The finger vein image inputting device according to claim 14,
further comprising a polarizing filter provided at least one of between the light source and the finger and between the finger and the imaging device.

16. The finger vein image inputting device according to claim 15,
wherein the light source, the band pass filter, the gradient index lens, and the imaging section are attached to the body of an apparatus.

17. The finger vein image inputting device according to claim 16, wherein the body belongs to a mobile telephone apparatus.

18. The finger vein image inputting device according to any of claim 14,
wherein the light source, the band pass filter, the gradient index lens, and the imaging section are attached to the body of an apparatus.

19. The finger vein image inputting device according to claim 18, wherein the body belongs to a mobile telephone apparatus.

20. The finger vein image inputting device according to claim 1,
further comprising a polarizing filter provided at least one of between the light source and the finger and between the finger and the imaging device.

21. The finger vein image inputting device according to claim 20,
wherein the light source, the band pass filter, the gradient index lens, and the imaging section are attached to the body of an apparatus.

22. The finger vein image inputting device according to claim 21, wherein the body belongs to a mobile telephone apparatus.

23. The finger vein image inputting device according to claim 1,
wherein the light source, the band pass filter, the gradient index lens, and the imaging section are attached to the body of an apparatus.

24. The finger vein image inputting device according to claim 23, wherein the body belongs to a mobile telephone apparatus.

* * * * *